(12) United States Patent
Keller et al.

(10) Patent No.: US 9,717,043 B2
(45) Date of Patent: *Jul. 25, 2017

(54) REGULATION BY MSC SERVER WHEN USING SGS/GS

(75) Inventors: Ralf Keller, Würselen (DE); Fredrik Lindholm, Stockholm (SE); Magnus Olsson, Stockholm (SE); Jian Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1576 days.

This patent is subject to a terminal disclaimer.

(21) Appl. No.: 13/128,544

(22) PCT Filed: Nov. 9, 2009

(86) PCT No.: PCT/EP2009/064841
§ 371 (c)(1),
(2), (4) Date: Sep. 2, 2011

(87) PCT Pub. No.: WO2010/055012
PCT Pub. Date: May 20, 2010

(65) Prior Publication Data
US 2011/0306321 A1 Dec. 15, 2011

Related U.S. Application Data

(60) Provisional application No. 61/113,379, filed on Nov. 11, 2008.

(51) Int. Cl.
*H04W 4/00* (2009.01)
*H04W 48/18* (2009.01)
(Continued)

(52) U.S. Cl.
CPC ......... *H04W 48/18* (2013.01); *H04L 65/1016* (2013.01); *H04L 65/1073* (2013.01); *H04W 92/24* (2013.01)

(58) Field of Classification Search
CPC . H04W 80/10; H04W 48/18; H04W 36/0016; H04W 36/0066; H04W 72/04;
(Continued)

(56) References Cited

U.S. PATENT DOCUMENTS 8,233,417 B1 * 7/2012 Goldner ...................... 370/310.2
8,340,084 B2 * 12/2012 Nakada ................. H04W 48/18
370/352
(Continued)

FOREIGN PATENT DOCUMENTS

CN 1706207 A 12/2005
CN 1770764 A 5/2006
(Continued)

OTHER PUBLICATIONS

Zte, "Registration Using I2 in Location Cancellation Procedure", 3GPP TSG-SA WG2 Meeting #68, Oct. 13-17, 2008, Qingdao, China, S2-086853.

(Continued)

*Primary Examiner* — Nimesh Patel
(74) *Attorney, Agent, or Firm* — Coats & Bennett, PLLC

(57) ABSTRACT

A method of registering a subscriber in an IP Multimedia Subsystem (IMS) is provided, wherein the method is executed by a call control node (800), wherein the method comprises receiving (402) an access request of the subscriber for circuit switched accessing the IMS, the access request being received via an access, determining (404) an access type of the access, and sending (406) a registration request for circuit switched registering the subscriber in the IMS depending on the determined access type.

31 Claims, 11 Drawing Sheets

(51) Int. Cl.
*H04W 92/24* (2009.01)
*H04L 29/06* (2006.01)

(58) Field of Classification Search
CPC ..... H04W 88/16; H04W 88/182; H04W 8/04;
H04W 8/08; H04W 8/12; H04W 76/02;
H04W 76/06; H04W 4/16; H04W 8/06;
H04W 36/00; H04W 6/0011; H04W
76/00; H04L 65/1016; H04L 65/1006;
H04L 65/1069; H04L 65/1073; H04L
61/2564; H04L 29/12556; H04L 61/2585;
H04L 65/1036; H04L 65/1043; H04L
12/66; H04L 65/104; H04L 67/14; H04L
29/12358; H04L 12/64; H04L 29/12188;
H04L 65/1023; H04M 15/56; H04M
15/90; H04M 2215/202; H04M 2215/208
USPC .................. 455/435.1, 435.2, 411, 440, 448;
370/331, 328, 285, 401
See application file for complete search history.

(56) References Cited

U.S. PATENT DOCUMENTS

2003/0186681 A1 10/2003 Gabor
2006/0229057 A1* 10/2006 Farrugia et al. ............. 455/403
2006/0268904 A1* 11/2006 Bae et al. .................... 370/401
2011/0153866 A1* 6/2011 Keller et al. .................. 709/244
2011/0306321 A1* 12/2011 Keller et al. .................. 455/411

FOREIGN PATENT DOCUMENTS

CN          101031139 A1    9/2007
WO          2008/055559 A1  5/2008
WO          2008/120028 A1  10/2008

OTHER PUBLICATIONS

3rd Generation Partnership Project. "Clarify ICS T-ADS for Users Registered with Multiple Devices." 3GPP TSG-SA2 Meeting #68, S2-086955, Qing Dao, China, Oct. 13-17, 2008.

3rd Generation Partnership Project. 3GPP TS 23.292, V8.1.0 (Sep. 2008). 3rd Generation Partnership Project; Technical Specification Group Services and System Aspects; IP Multimedia Subsystem (IMS) Centralized Services; State 2 (Release 8), Sep. 2008.

3rd Generation Partnership Project. 3GPP TS 23.221, V8.2.0 (Sep. 2008). 3rd Generation Partnership Project; Technical Specification Group Services and System Aspects; Architectural requirements (Release 8), Sep. 2008.

3rd Generation Partnership Project. "Options for SGs Interface." 3GPP TSG CT WG1 Meeting #52, C1-082094, Jeju Island, Korea, Apr. 7-11, 2008.

* cited by examiner

REGULATION BY MSC SERVER WHEN USING SGS/GS

CROSS-REFERENCE TO RELATED APPLICATIONS

This application is the National Stage of Internatinoal App. No. PCT/EP09/64841, filed Nov. 9, 2009, which claims priority under 35 U.S.C. §119(e) to U.S. Prov. App. No. 61/113,379, filed on Nov. 11, 2008, all of which are entitled "REGULATION BY MSC SERVER WHEN USING SGS/GS," and all of which are hereby incorporated by reference as if fully set forth herein.

TECHNICAL FIELD

The invention relates to registering a subscriber in the IMS by a MSC Server when using SGs/Gs interfaces for an access and to terminating a session to the subscriber via the SGs/Gs interfaces.

BACKGROUND

Mobile networks are currently evolving from pure circuit switched (CS) networks towards IP based networks, and by that integrate into IP based infrastructures that are also used for the Internet, the World Wide Web and the datacom industry.

With this trend mobile networks closely follow the evolution steps of the wireline networks, where Voice over Internet Protocol (VoIP) via Digital Subscriber Line (DSL) access or via Wireless Local Area Network (WLAN) access is an existing technology today.

Mobile operators that install IP Multimedia Subsystem (IMS) networks and offer IMS services intend to make these services available also to Global Systems for Mobile Communications (GSM)/Wideband Code Division Multiple Access (WCDMA) subscribers. Hereto, calls from and to this group of GSM/WCDMA subscribers need to be routed through the IMS network, in order to reach an IMS service engine. This concept is called IMS Centralized Services (ICS). The IMS centralized Services work item in the 3$^{rd}$ Generation Partnership Program (3GPP) targets at using the circuit switched (CS) access for an access to IMS services (see, for example, 3GPP Technical Specification 23.292) and is complemented by IMS Service Continuity(see, for example, 3GPP Technical Specification 23.237).

In parallel to the ICS trend, the packet core is evolving (Evolved Packet Core, EPC) as part of the Evolved Packet System (EPS), supporting eUTRAN (evolved Universal Terrestrial Radio Access Network) as new Radio Access Network (RAN). As part of this discussion, work on Single Radio Voice Call Continuity (SRVCC) is ongoing in 3GPP SA2 (see, for example, 3GPP Technical Specification 23.216), enabling to transfer an IMS voice call from a EPS based (access) network towards a CS based (access) network and vice versa. It is envisioned that SRVCC is combined with ICS for an IMS centralized solution supporting also SRVCC from eUTRAN to UTRAN/GERAN.

Referring to FIG. 1, an exemplary SRVCC architecture figure for a handover of an user equipment from an eUTRAN access network to a to CS access network, particularly to the UTRAN/GERAN access networks, is illustrated:

An user equipment UE is attached to the eUTRAN access network (depicted as E-UTRAN) via an LTE-Uu interface. A Mobility Management Entity MME is in communication with the eUTRAN access network as well as with a Serving GPRS Support Node (SGSN) which in turn is in communication with the UTRAN/GERAN access networks. A Mobile Switching Center (MSC) Server is in communication with the target UTRAN/GERAN access networks allowing for circuit switched data transfer. The MSC Server is enhanced for SRVCC and may have an ISDN User Part (ISUP) or a Session Initiation Protocol (SIP) interface. In the following, it is assumed that the MSC Server offers a SIP interface.

It is currently discussed to expand the SRVCC solution described in the 3GPP Technical Specification 23.216 by a SGs reference point or interface between the MSC Server and a Mobility Management Entity (MME).

Referring to FIG. 2, an exemplary architecture of a telecommunications network for a handover of an user equipment from an e-UTRAN access network to UTRAN/GERAN access networks is illustrated.

The architecture shown in FIG. 2 is similar to the SRVCC architecture shown in FIG. 1. Further, a SGs interface between a MME and a MSC Server is depicted.

Referring to FIG. 3, an exemplary architecture of a telecommunications network for an user equipment attaching to UTRAN/GERAN access networks and to an eUTRAN access network (depicted as E-UTRAN) is illustrated. As also known from the 3GPP Technical Specification 23.272, there is a SGs reference point between the MSC Server and the MME.

It may be expected that in certain configurations of the architecture of a telecommunications network the MSC Server may have a Gs reference point or interface for communication with a SGSN and a SGs interface for communication with the MME. In both cases, the UE would be CS attached in the MSC Server also when camping on a PS access only. It may be noted that a CS attachment of the user equipment may be performed using, by way of example, the Gs and SGs interfaces which are currently under specification in 3GPP but show certain deficiencies. However, further interfaces may also be usable for attaching an user equipment to a MSC Server when the user equipment is camping on a PS access network. Hence, the SGs and Gs interfaces are used as exemplary embodiments of the invention but do not limit the scope of the invention.

Accordingly, when a MSC Server enhanced for ICS receives a request for a CS attachment from the UE, the MSC Server may register the user in IMS, as described in the 3GPP Technical Specification 23.292. It may be noted that the Technical Specification 23.292 does not discuss the case of performing a circuit switched attachment procedure of the UE via the SGs interface. Depending on the preferences, the SCC AS (Service Centralization and Continuity Application Server) may consider this registration in a Terminating Access Domain Selection (T-ADS) and/or a Serving-Call Session Control Function (S-CSCF) may try to perform sequential or parallel forking for terminating sessions to the user equipment using a MSC Server, even when a user equipment/a subscriber is only reachable via a packet switched access.

The SGs may be used in SRVCC to avoid interacting with the Home Subscriber Server (HSS)/Home Location Register (HLR) during performing a handover from a packet switched access such as the eUTRAN access/High Speed Packet Access (HSPA) towards a circuit switched (CS) access. It may take up to several seconds to download subscriber data from the HLR in a visited network. This delay may be unacceptable for SRVCC, however, the solution currently described in the 3GPP Technical Specification 23.216 may not make use of the SGs interface.

SUMMARY

It is an object of the invention to provide a method of circuit switched registering a subscriber in an IP Multimedia Subsystem (IMS), a call control node for circuit switched registering a subscriber in an IP Multimedia Subsystem (IMS), a method of terminating a session to a subscriber, and a call control node for terminating a session to a subscriber which may provide enhanced characteristics.

The object may be achieved by the subject-matter of the independent claims. Advantageous embodiments are described in the further claims.

One or more embodiments herein enable a Mobile Switching Center (MSC) Server and an IP Multimedia Subsystem (IMS) to perform the following.

According to an exemplary aspect of the invention, a method of circuit switched registering a subscriber in an IP Multimedia Subsystem (IMS) may be provided. The method may be executed by a call control node. The method may comprise receiving an access request of the subscriber for circuit switched accessing the IMS, the access request being received via an access, determining an access type of the access, and sending a registration request for circuit switched registering the subscriber in the IMS depending on the determed access type.

According to another exemplary aspect of the invention, a call control node (MSC Server) for circuit switched registering a subscriber in an IP Multimedia Subsystem (IMS) may be provided. The call control node may comprise a receiving unit for receiving an access request of the subscriber for circuit switched accessing the IMS, the access request being received via an access, a determining unit for determining an access type of the access, and a sending unit for sending a registration request for circuit switched registering the subscriber in the IMS depending on the determined access type.

In particular, the call control node may be adapted to perform a method described above.

According to another exemplary aspect of the invention, a method of terminating a session to a subscriber may be provided. The method may be executed by a call control node. The method may comprise receiving a registration request for circuit switched registering a subscriber in the IMS, circuit switched registering the subscriber in the IMS, determining whether a registration shall be considered when terminating the session to the subscriber, and terminating the session to the subscriber.

According to another exemplary aspect of the invention, a call control node for performing terminating a session to a subscriber may be provided. The call control node may comprise a receiving unit for receiving a registration request for circuit switched registering a subscriber in an IP Multimedia Subsystem (IMS), a registering unit for circuit switched registering the subscriber in the IMS, a determining unit for determining whether a registration shall be considered when terminating the session to the subscriber, and a terminating unit for terminating the session to the subscriber.

In particular, the call control node may be adapted to perform a method described above.

In the context of this application, the terms "subscriber", "user", "user equipment" and "UE" may be used in a mutually exchangeable way. In particular, a subscriber or a user may particularly denote a person who may use a user equipment (which may be referred to by the abbreviation "UE") to subscribe in a service, particularly in the IMS. In particular, an user equipment may be a telecommunications device such as a mobile phone which may be used during communications with further telecommunications devices or entities which may be used during a communications establishment or an ongoing telecommunications session or call.

The term "circuit switched registering" may particularly denote a procedure which a subscriber may perform or use to register in at least one of a network, a logical entity of a network, a node of a network, and a service in a circuit switched (based) way. In particular, a subscriber may camp on a circuit switched (based) access network or a packet switched (based) access network and may or may not packet switched (based) register.

The term "circuit switched accessing" may particularly denote a procedure which a subscriber may perform or use to access at least one of a network, a logical entity of a network, a node of a network, and a service in a circuit switched based way. In particular, a subscriber may camp on a circuit switched (based) access network or a packet switched (based) access network and may or may not access at least one of a network, a logical entity of a network, a node of a network, and a service in a packet switched way.

The term "attach(ment)" may particularly denote an "initial location update" procedure performed by a subscriber towards a network, particularly towards a control node of a network. In particular, an "attach(ment)" procedure and an "initial location update" procedure may denote similar procedures. In particular, a control node may receive an access request from a subscriber by means of, for example, an initial location update request (or an attach request or a request for attaching) or a location update request. In case of an initial location update request of a subscriber, the subscriber may access the network for a first time, while in case of a location update request the subscriber may refresh information towards a network.

The term "reference point" may particularly denote any interface between two networks or two (logical) entities of the same network or of different networks.

The term "interface" may particularly denote at least one of an internal interface of a node and an external interface to or towards a node. In particular, an interface may be a reference point.

According to an exemplary embodiment, in a first solution, the subscriber may be registered only when an appropriate message such as an attach request or a location update request may be received via the A interface or Iu-cs interface, i.e. via a circuit switched access. This solution may not provide for a registration of the user in the IMS prior to performing Single Radio Voice Call Continuity (SRVCC), but at least, the subscriber may be CS attached and the MSC Server would have downloaded the subscriber data from a Home Location Register (HLR).

According to another exemplary embodiment, in another, more enhanced solution, the subscriber may be registered even when an appropriate message such as an attach or location update may be received via a SGs interface or a Gs interface, i.e. via a packet switched access. However, in that case, this may lead to information towards a Service Centralization and Continuity Application Server (SCC AS) to not consider this registration when performing terminating access domain selection (T-ADS). Once, an appropriate message such as an attach or location update may be received via the A interface or Iu-cs interface, i.e. via a circuit switched access, the SCC AS may be informed to consider this registration when performing terminating access domain selection.

BRIEF DESCRIPTION OF THE DRAWINGS

Embodiments of the invention will be described in more detail hereinafter with reference to examples but to which the scope of the invention is not limited.

DETAILED DESCRIPTION

Figure 1:
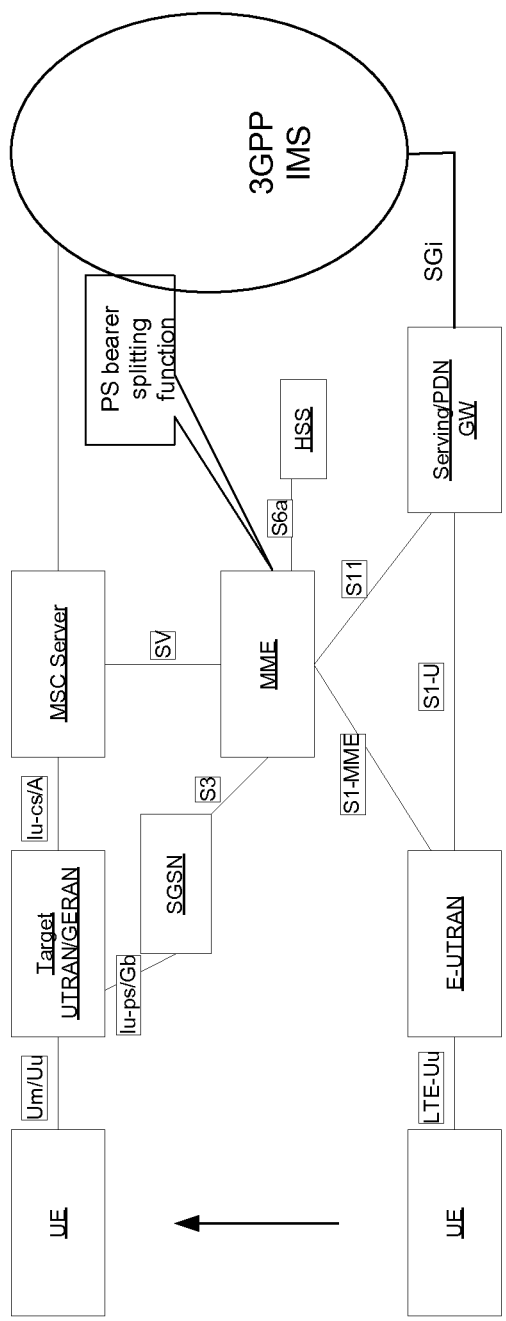
FIG. 1 is a block diagram illustrating an exemplary SRVCC communications architecture.
Figure 2:
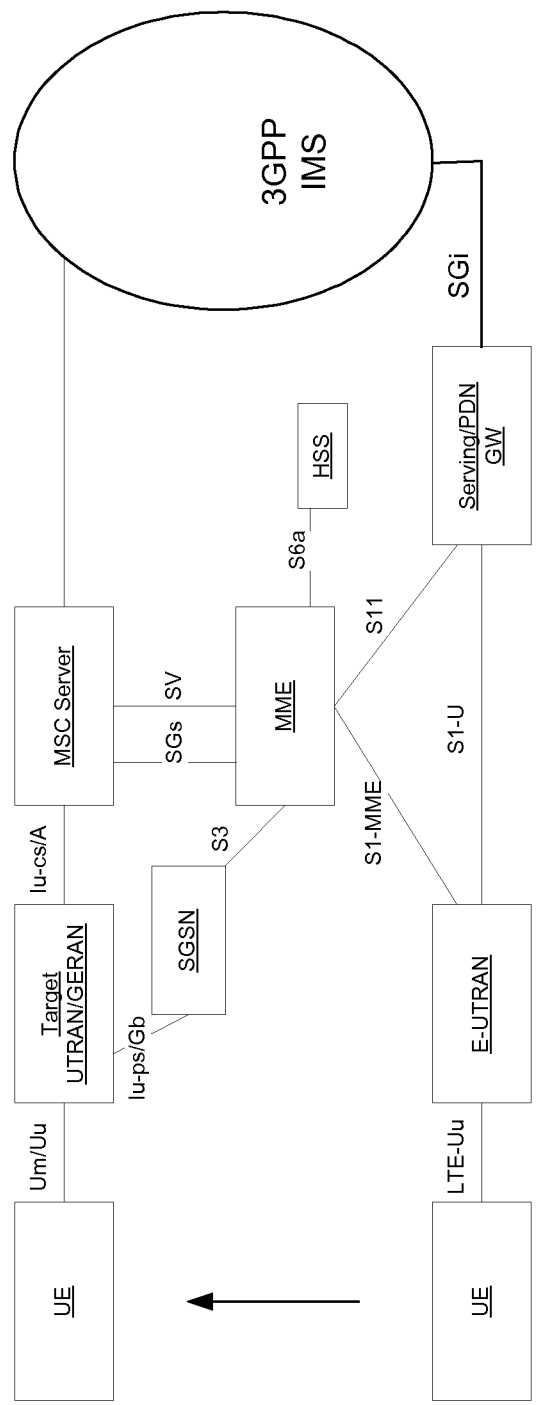
FIG. 2 is a block diagram illustrating another exemplary SRVCC communications architecture.
Figure 3:
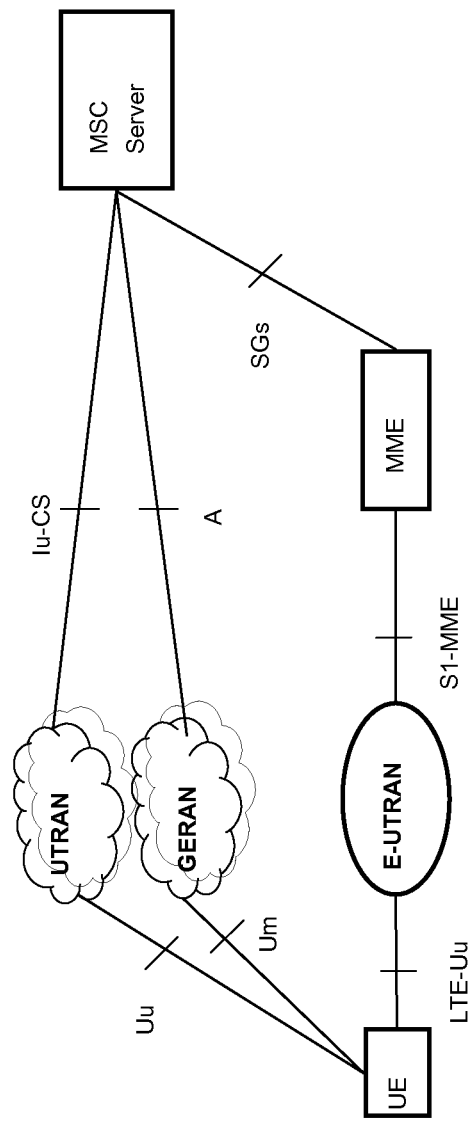
FIG. 3 is a block diagram illustrating another exemplary communications architecture when a subscriber accesses a Mobile Switching Center Server.

The illustration in the drawing is schematic. In different drawings, similar or identical elements are provided with the same reference signs or with the same abbreviations.

Figure 4:
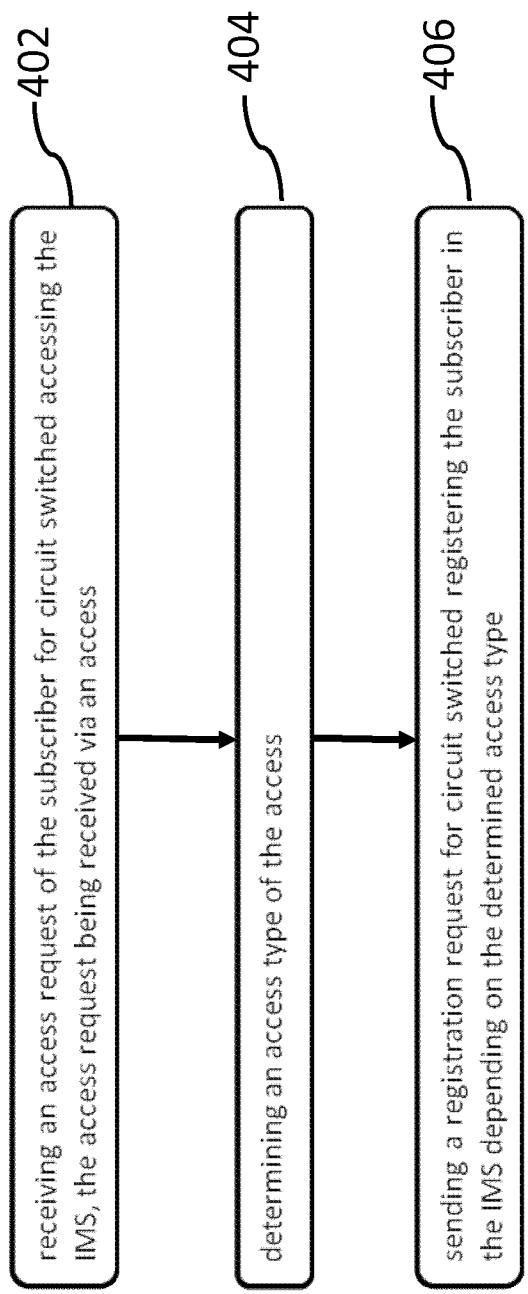
FIG. 4 is a flow diagram illustrating a method of circuit switched registering a subscriber in the IMS according an exemplary embodiment of the invention.

Referring to FIG. 4, a method of circuit switched registering a subscriber in the IMS according to an exemplary embodiment of the invention will be described.

The method is executed by a call control node, particularly by a Mobile Switching Center (MSC) Server. The method comprises receiving an access request of the subscriber for circuit switched accessing the IMS, the access request being received via an access, as is indicated by a block 402. Further, as is indicated by a block 404, the method comprises determining an access type of the access. Further, according to a block 406, the method comprises sending a registration request for circuit switched registering the subscriber in the IMS depending on the determined access type.

The access may comprise at least one of an interface to the call control node and an access network via which the subscriber may access the call control node.

Sending the registration request may be performed only upon determining that the access type may be a circuit switched type.

The method may comprise downloading subscriber data from a home location register.

The method may comprise sending a registration consideration indication whether a Service Centralization and Continuity Application Server (SCC AS) of the IMS may be intended to consider the registration of the subscriber in the IMS when terminating a session to the subscriber depending on the determined access type.

Sending the registration consideration indication may be at least one of simultaneously or subsequently to sending the registration request.

Sending the registration request and the registration consideration indication may be in at least one of a single message and separate messages.

The registration consideration indication may comprise at least one of an indication of registering support for an IMS speech service, an indication of registering support for media capabilities for the subscriber, an indication of the access type, and an indication whether to terminate a session to the subscriber.

The media capabilities may comprise at least one of audio capabilities and of audio and video capabilities.

Sending the registration consideration indication may be upon determining that the access type may be packet switched type, wherein the registration consideration indication may comprise an indication that the SCC AS shall not consider the registration when terminating the session to the subscriber.

Sending the registration consideration indication may be upon determining that the access type may be a circuit switched type, wherein the registration consideration indication may comprise an indication that the SCC AS shall consider the registration when terminating the session to the subscriber.

The method may comprise sending a further registration request for circuit switched registering the subscriber in the IMS depending on the determined access type and sending a further registration consideration indication whether a Service Centralization and Continuity Application Server (SCC AS) of the IMS may be intended to consider the registration of the subscriber in the IMS when terminating a session to the subscriber depending on the determined access type, wherein sending the further registration consideration indication may be upon determining that the access type may be a circuit switched type, wherein the further registration consideration indication may comprise an indication that the SCC AS can consider the registration when terminating the session to the subscriber.

Sending a further registration request may be based on a further access request of the subscriber for circuit switched accessing the IMS, the further access request being received via an access.

Receiving the access request may comprise receiving at least one of an initial location update request and a location update request.

Figure 5:
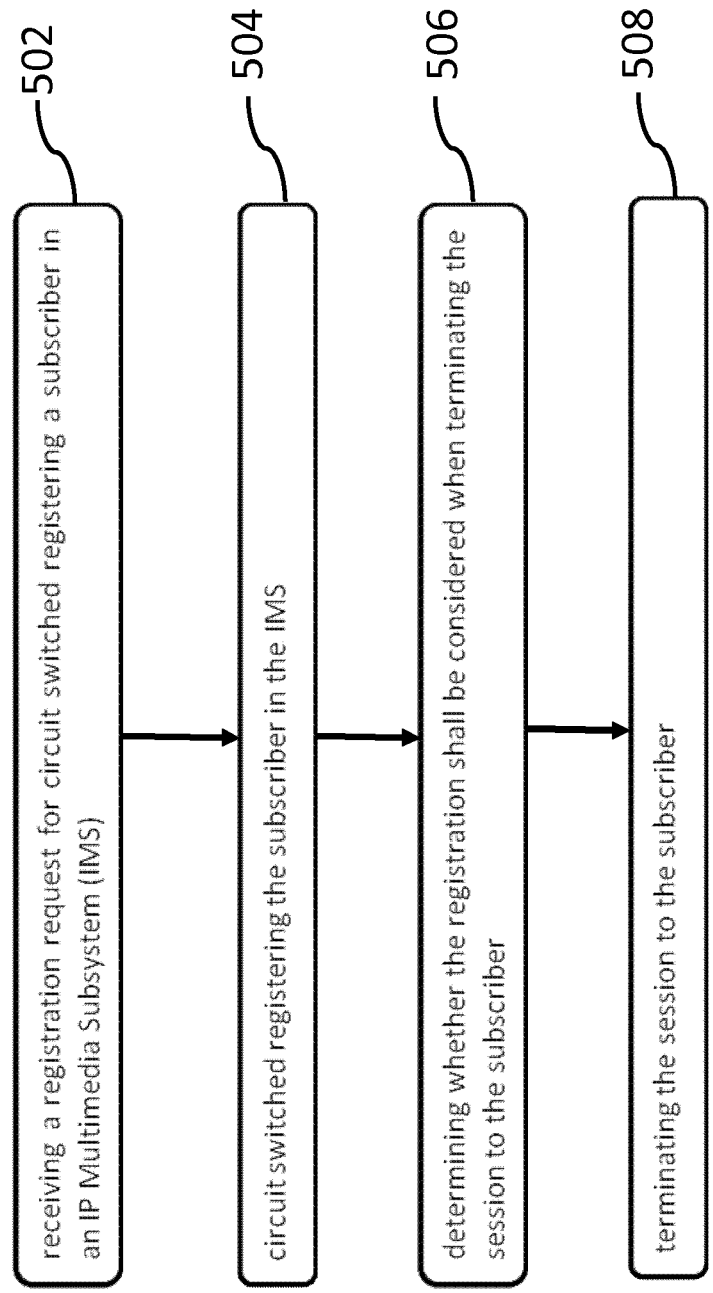
FIG. 5 is a flow diagram illustrating a method of terminating a session to a subscriber according another exemplary embodiment of the invention.

Accordingly, referring to FIG. 5, a method of terminating a session to a subscriber according to an exemplary embodiment of the invention will be described.

The method is executed by a Service Centralization and Continuity Application Server SCC AS. The method comprises receiving a registration request for circuit switched registering a subscriber in an IP Multimedia Subsystem (IMS), as is indicated by a block 502. Further, the method comprises circuit switched registering the subscriber in the IMS, as is indicated in a block 504. The method further comprises determining whether the registration is intended to be considered when terminating the session to the subscriber, as is indicated by a block 506. The method also comprises terminating the session to the subscriber, as is indicated by a block 508.

Circuit switched registering the subscriber in the IMS may be based on the received registration request.

Determining may comprise receiving a registration consideration indication whether the registration of the subscriber in the IMS shall be considered when terminating the session to the subscriber.

The method may comprise receiving a further registration request for circuit switched registering the subscriber in the IMS, wherein determining may comprise receiving a further registration consideration indication whether a Service Centralization and Continuity Application Server (SCC AS) of the IMS may be intended to consider the registration of the subscriber in the IMS when terminating a session to the subscriber.

The method may comprise further circuit switched registering the subscriber in the IMS based on the received further registration request. The method may comprise further determining whether the further registration may be intended to be considered when terminating the session to the subscriber. Determining and further determining may be at least one of simultaneously and subsequently to one another.

Determining may comprise fetching status information of an access type of the access via which the subscriber may access the IMS.

The status information may comprise attachment information of the subscriber.

Determining may comprise receiving a subscriber preference indication whether to consider the registration when terminating the session to the subscriber.

Figure 6A:
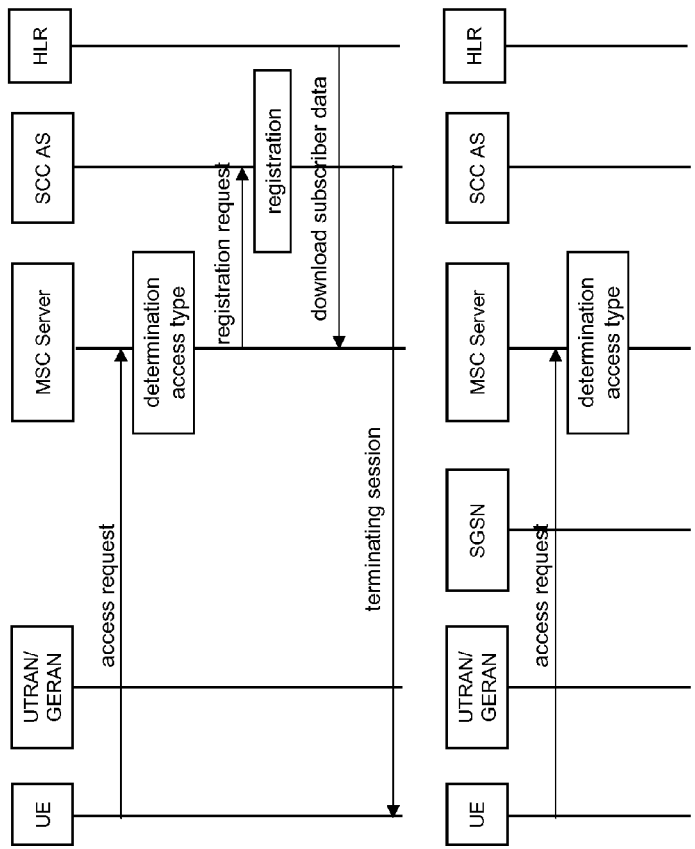
FIGS. 6A, 6B, 6C are flow diagrams illustrating methods of circuit switched registering a subscriber in the IMS and of terminating a session to a subscriber according to another exemplary embodiments of the invention.
Figure 6B:
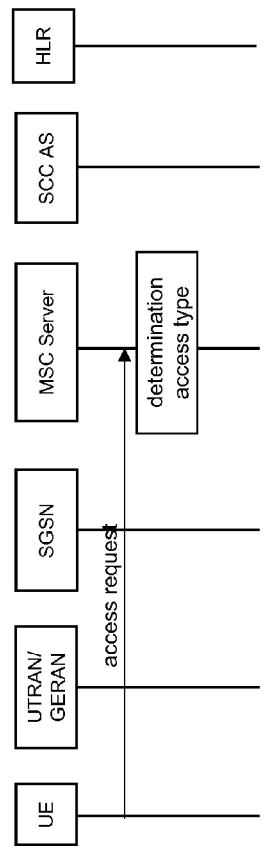
Figure 6C:
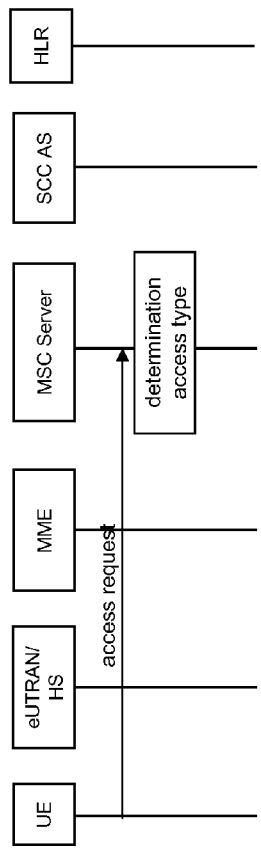

Referring to FIG. 6A-6C, a method of circuit switched registering a subscriber in the IMS and of terminating a session to a subscriber according to another exemplary embodiments of the invention is illustrated.

In this solution, the MSC Server is configured to not register the user when receiving an appropriate message such as a CS attach or location update via a packet switched interface such as a SGs interface or a Gs interface (FIGS. 6B, 6C). The MSC Server will only register the ICS subscriber when receiving an appropriate message such as a CS attach or location update via the A interface or the Iu-cs interface, i.e. via a circuit switched access (FIG. 6A).

According to another exemplary embodiments of the methods of circuit switched registering a subscriber in the IMS and of terminating a session to the subscriber, an enhanced solution may follow the rule of thumb "Register (the subscriber) but do not terminate calls or sessions (to the subscriber)", which will be described in the following with reference to FIG. 7A-7D.

Although these embodiments being described in the following with reference to the known interfaces, particularly to the SGs and Gs interfaces, these interfaces are merely for describing the gist of the invention.

In the following, an exemplary SGs interface is assumed for explanation purposes.

Figure 7A:
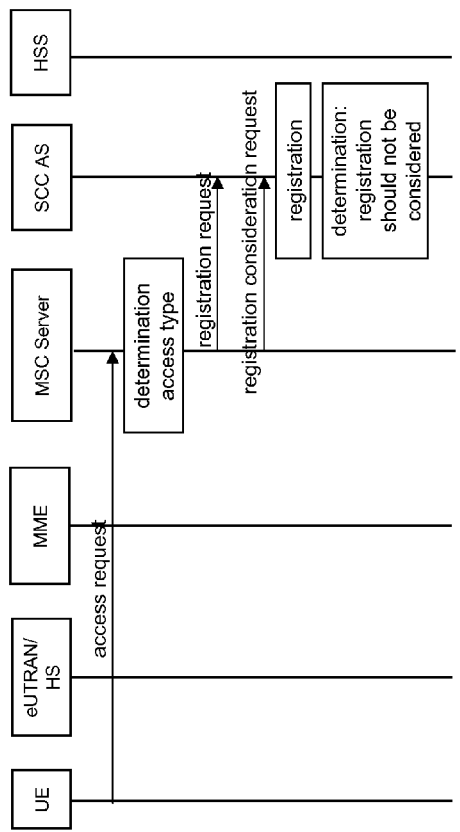
FIGS. 7A, 7B, 7C, 7D are flow diagrams illustrating methods of circuit switched registering a subscriber in the IMS and of terminating a session to a subscriber according to another exemplary embodiments of the invention.

A MSC Server, when receiving an appropriate message such as an attach/location update message via the SGs interface, performs the following depending on the access which the subscriber uses:

In the following, it will be referred to FIG. 7A.

If the UE is camping on an eUTRAN or HS (High Speed Packet access) access network only (the subscriber is only CS attached via the SGs interface), for example, as indicated in a Location Update Request received, for example, from a MME, the MSC Server may know that the subscriber UE is (E)PS-attached (see, for example, the 3GPP Technical Specification 23.272).

Then the MSC Server registers the ICS subscriber in the IMS.

The MSC Server may indicate in or along the registration request that the registration should not be considered when performing a terminating access domain selection (T-ADS). This no-consideration or non consideration may be done, for example, by omitting to register support for an IMS speech service (MMTEL), or omitting support for audio (/video) capabilities, for example, support for at least one of audio capabilities and of audio and video capabilities, or by indicating the access network type through or via which the subscriber accesses the MSC Server. Alternatively or in addition, a special indication may be included in a REGISTER (command) to indicate that T-ADS should be not be performed. For example, a feature tag in the contact header like "3gpp.ics.no_tads" may be used for this purpose. This may allow originating calls in the SRVCC case without performing first a registration in the IMS.

Figure 7B:
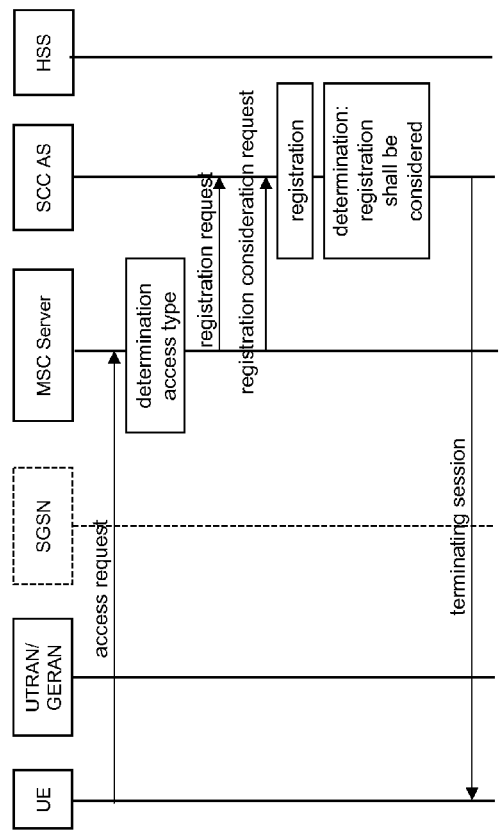

In the following, it will be referred to FIG. 7B.

Else is the case when the UE is camping on UTRAN or GERAN (GSM EDGE Radio Access Network) access networks. That is, the MSC Server receives the location update via the Iu-cs interface, the A interface or the Gs interface.

The MSC Server then registers the ICS subscriber in the IMS but indicates in the registration that this registration shall be considered when performing a T-ADS. In this case, the MSC server may include support for MMTEL and audio (/video) capabilities, for example, support for at least one of audio capabilities and of audio and video capabilities, and alternatively or in addition, may include a feature tag in the contact such as the tag "3gpp.ics_tads".

For the former case, the SCC AS receives this indication when one or more filter criteria are directing the S-CSCF to send a 3-party REGISTER (command) to the SCC AS. The SCC AS may use this indication such that this contact is not selected when performing a T-ADS, as is specified in the 3GPP Technical Specification 23.292 and 23.237.

Figure 7C:
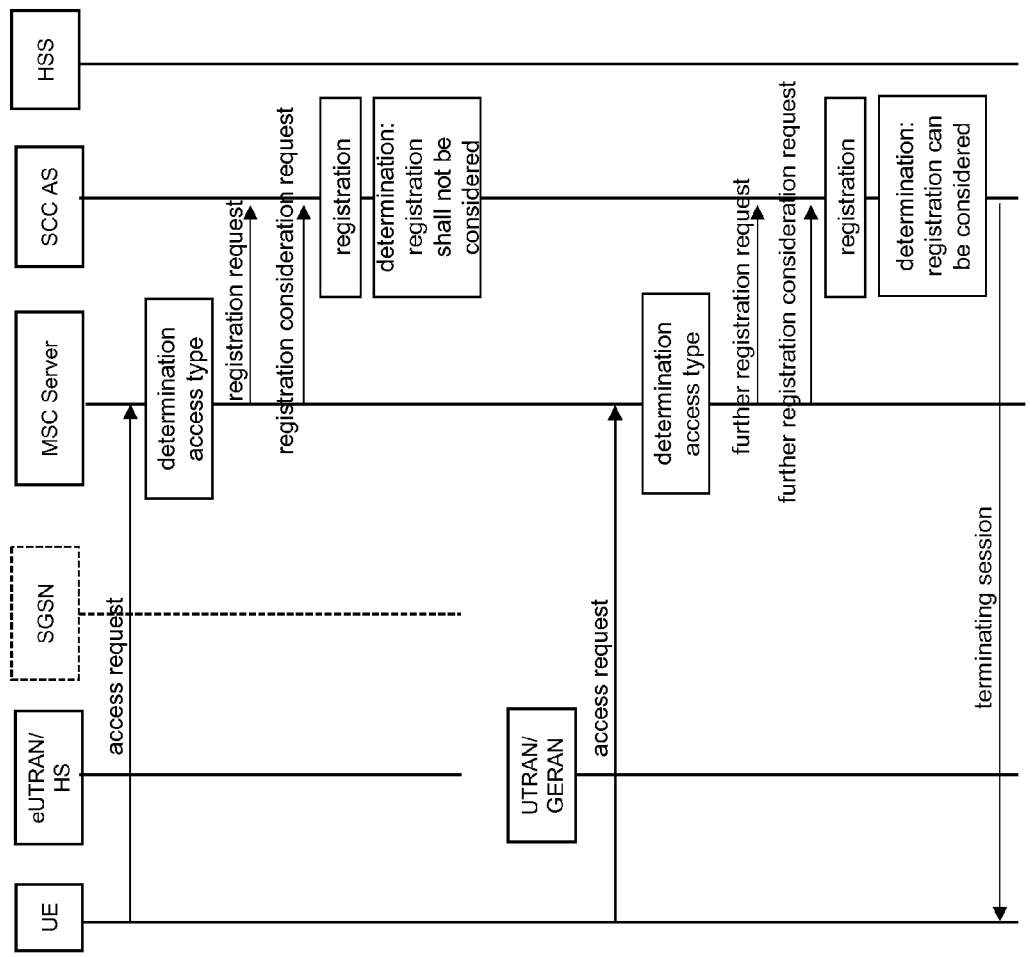

In the following, it is referred to FIG. 7C.

When the MSC Server receives an appropriate message such as an attach/location update message via the A interface or the Iu-cs interface, i.e. via a circuit switched access, the MSC Server may send a (re-)register to the IMS, indicating now that this contact can be selected when performing a T-ADS. In this case, the MSC server may include support for MMTEL and audio(/video) capabilities, for example, support for at least one of audio capabilities and of audio and video capabilities, or avoid omit the dedicated indication (for example, see the feature tag example described above), if such option may be used.

In the following, it will be referred to FIG. 7D.

As an alternative to above, the MSC registers the ICS user towards the SCC AS without any specific indication about the access type. Instead, in order to decide if the ICS user is CS reachable or not, the SCC AS fetches attach status information (information pertaining to the subscriber being PS/CS attached or not, which may be known, for example, via an Attach Type) from a Home Subscriber Server (HSS). However, when the MSC Server receives the location update via the SGs interface, the HSS may think the UE is CS attached. A Mobile Application Part (MAP) update may be needed to provide additional status information from the MSC to the HSS. Such a MAP update may be not recommended.

Again referring to FIG. 7B, methods of registering a subscriber in the IMS and of terminating a session to the subscriber will described assuming an exemplary Gs interface.

A MSC Server, when receiving an appropriate message such as an attach/location update message via the Gs interface, performs the following:

Since the UE is camping on GERAN or UTRAN access networks, what is, for example, indicated in an appropriate message such as a Location Update request received from the SGSN, the MSC Server knows that the UE is CS attached.

Then the MSC Server may register the ICS subscriber in the IMS.

The MSC Server may indicate in or along the registration that the registration should be considered when performing a T-ADS.

Figure 7D:
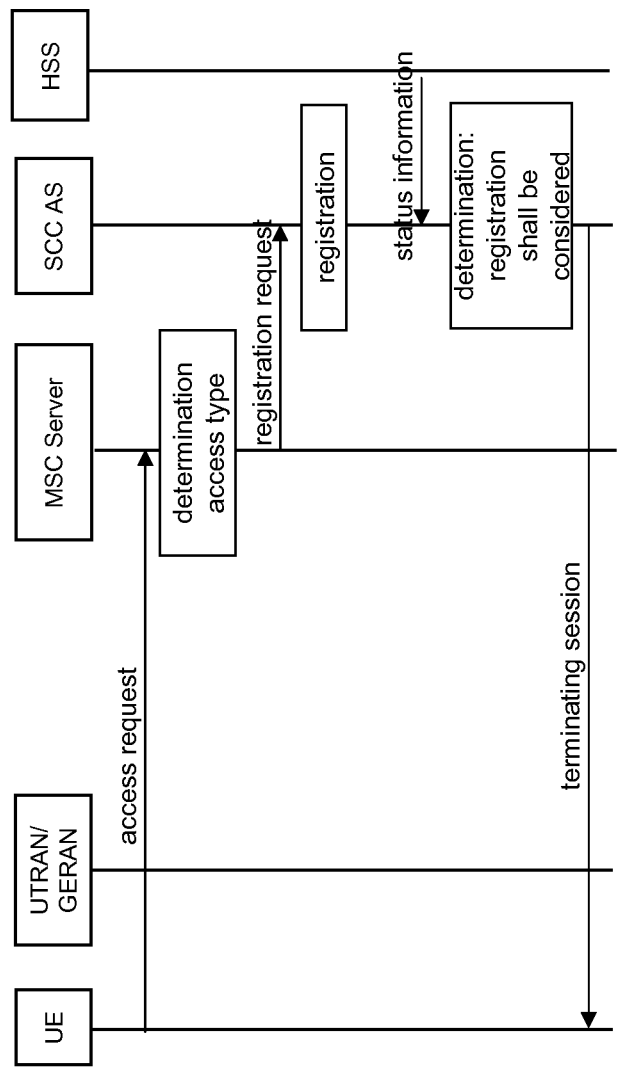

Similarly to FIG. 7D, as an alternative to above, the MSC may register the ICS subscriber towards the SCC AS without any specific indication about the access type. Instead, in order to decide if the ICS subscriber is CS reachable or not, the SCC AS may fetch attach status information (information pertaining to the subscriber being PS attached or not, which may be known, for example, via an Attach Type) from the HSS (see above).

The SCC AS receives this indication when one or more filter criteria are directing the S-CSCF to send a 3-party REGISTER (command) to the SCC AS.

The SCC AS may use this indication such that this contact can be selected when performing a T-ADS, as is specified in the 3GPP Technical Specification 23.292 and 23.237.

In the following, reference will be made to the SCC AS.

In addition to the above-described functionality of the SCC AS, when the SCC AS successfully performs a session transfer, and if the contact for the transferring-in domain is marked as "not consider when performing T-ADS", then this contact should be marked as "consider when performing T-ADS". This procedure may be performed by the SCC AS. This may be beneficial for the SRVCC case when a MSC Server enhanced for SRVCC performs first a session transfer before being able to update the registration in the IMS indicating that the contact can be selected when performing a T-ADS.

In the following, a solution according to another exemplary embodiment will be described:

Here, an UE also may make use of appropriate flags such as the flag "3gpp.ics.no_tads".

An UE which may be simultaneously connected to more than one access network, particularly to at least two PS access networks, may want to use one or more of these for originated calls but might want all terminating calls only via one particular access. This may be useful in in-home scenarios or applications but also for session continuity applications, in which the UE should be able to origin a session transfer request on an Internet Protocol Connectivity Access Network (IP CAN) but may not want to receive terminating sessions over this IP CAN until the UE has completed the session transfer.

After completing the session transfer, the UE may need to (re-)register to indicate towards the SCC AS to consider this access for terminating sessions.

Figure 8:
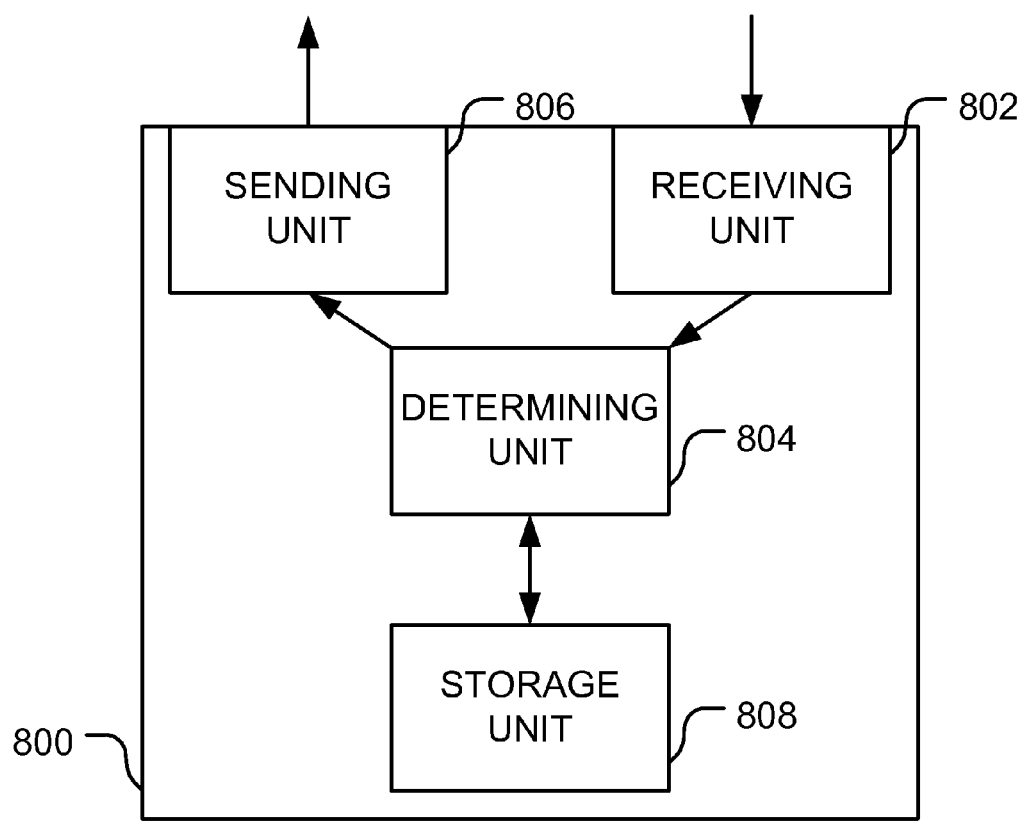
FIG. 8 is a block diagram illustrating a constitution of a Mobile Switching Centre Server according to an exemplary embodiment of the invention.

FIG. 8 illustrates a constitution of a call control node 800 according to an exemplary embodiment of the invention. The call control node 800 is adapted as MSC Server.

The call control node 800 comprises a receiving unit 802 for receiving an access request of a subscriber for circuit switched accessing the IMS, the access request being received via an access. Further, the call control node 800 comprises a determining unit 804 for determining an access type of the access, and a sending unit 806 for sending a registration request for circuit switched registering the subscriber in the IMS depending on the determined access type.

The determining unit 804 may be part of a processing unit, particularly a processor, in which appropriate algorithms may be executed to perform the determined access type.

The sending unit 806 is also adapted to send a registration consideration indication whether a SCC AS of the IMS is intended to consider the registration of the subscriber in the IMS when terminating a session to the subscriber depending on the determined access type. The sending unit 806 is also adapted to send a further registration request for circuit switched registering the subscriber in the IMS depending on the determined access type and is adapted to send a further registration consideration indication whether a Service Centralization and Continuity Application Server (SCC AS) of the IMS is intended to consider the registration of the subscriber in the IMS when terminating a session to the subscriber depending on the determined access type. The call control node 800 may comprise at least one further sending unit which may be adapted to perform at least one of the latter described functionalities.

Further, the call control node 800 comprises a storage unit 808 for storing information necessary during registering a subscriber in the IMS and/or terminating a session to a subscriber. This storage unit 808 may also not part of the call control node 800 but be designed as an independent unit.

Figure 9:
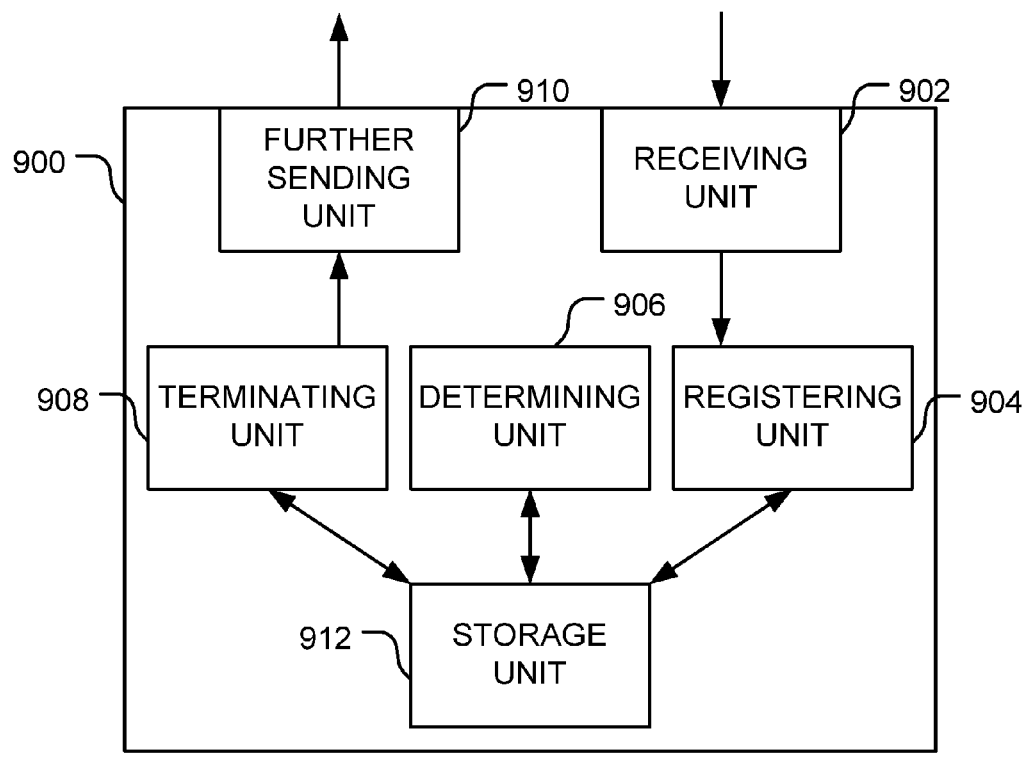
FIG. 9 is a block diagram illustrating a constitution of a Service Centralization and Continuity Application Server according to an exemplary embodiment of the invention.

FIG. 9 illustrates a constitution of a call control node 900 for performing terminating a session to a subscriber according to an exemplary embodiment of the invention. The call control node 900 is adapted as SCC AS.

The call control node 900 comprises a receiving unit 902 for receiving a registration request for circuit switched registering a subscriber in IP Multimedia Subsystem (IMS), a registering unit 904 for circuit switched registering the subscriber in the IMS, a determining unit 906 for determining whether the registration is intended to be considered when terminating the session to the subscriber, and a terminating unit 908 for terminating the session to the subscriber.

The receiving unit 902 is further adapted to receive a registration consideration indication whether the registration of the subscriber in the IMS is intended to be considered when terminating the session to the subscriber. The receiving unit 902 is also adapted to receive a further registration request for circuit switched registering a subscriber in the IMS and is adapted to receive a further registration consideration indication whether the registration of the subscriber in the IMS is intended to be considered when terminating the session to the subscriber. The call control node 900 may comprise at least one further receiving unit which may be adapted to perform at least one of the latter described functionalities.

The registering unit 904, the determining unit 906 and/or the terminating unit 908 may be designed as one common unit. In particular, at least two of the registering unit 904, the determining unit 906 and the terminating unit 908 may be designed as one common unit.

At least one of the registering unit 904, the determining unit 906 and the terminating unit 908 may be part of a processing unit, particularly a processor, in which appropriate algorithms may be executed to perform circuit switched registering the subscriber in the IMS, determining whether the registration is intended to be considered when terminating the session to the subscriber, and terminating the session to the subscriber, respectively.

The call control node 900 comprises a further sending unit 910 adapted to send a termination command indicating a termination of a session or a call to a subscriber.

Further, the call control node 900 comprises a storage unit 912 for storing information necessary during registering a subscriber in the IMS and/or terminating a session to a subscriber. The storage unit 912 is adapted to be accessed by at least one of the registering unit 904, the determining unit 906 and the terminating unit 908. The storage 912 unit may also not part of the call control node 900 but be designed as an independent unit.

In the following, advantages of exemplary embodiments of the invention may be described.

The main advantages may be the following:

The combined ICS and SRVCC solution may be enhanced such that the user may be registered by the MSC Server based on attach via a SGs interface in the IMS before the session transfer may be executed.

The ICS solution may be enhanced such that the user may be registered by the MSC Server based on attach via a Gs interface.

The SRVCC solution may be enhanced such that the SCC AS may determine precisely when a contact registered by the MSC Server shall be used for T-ADS or not.

Modifications and other embodiments of the disclosed invention will come to mind to one skilled in the art having the benefit of the teachings presented in the foregoing description and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

In the following, explanations of the abbreviations will be provided:

eNB refers to eNode B;
EPC refers to Evolved Packet Core;
EPS refers to Evolved Packet System;
eUTRAN or E-UTRAN refers to Evolved UTRAN;
ICS refers to IMS Centralized Services;
SRVCC refers to Single Radio Voice Call Continuity;
STI refers to Session Transfer URI (according to the 3GPP Technical Specification 23.237);
STN refers to Session Transfer Number; and
T-ADS refers to Terminating Access Domain Selection (according to the 3GPP Technical Specifications 23.292 and 23.237).

In the following, a list of references will be provided:
3GPP Technical Specification 23.216 directed to SRVCC;
3GPP Technical Specification 23.292 directed to IMS Centralized Services;
3GPP Technical Specification 23.237 directed to IMS Service Continuity; and
3GPP Technical Specification 23.272 directed to CS Fallback.

The invention claimed is:

1. A method executed by a call control node for circuit switched registering a subscriber in an IP Multimedia Subsystem (IMS), wherein the method comprises:
receiving, by the call control node, an access request of a subscriber for circuit switched accessing the IMS, the access request being received via an access,
determining an access type of the access, and
depending on the determined access type, sending, by the call control node, a registration request for circuit switched registering the subscriber in the IMS.

2. The method according to claim 1, wherein the access comprises at least one of an interface to the call control node and an access network via which the subscriber accesses the call control node.

3. The method of claim 2, wherein the interface to the call control node is at least one of an Iu-cs interface and an A interface.

4. The method according to claim 1, comprising sending the registration request only upon determining that the access type is a circuit switched type.

5. The method according to claim 4, further comprising downloading subscriber data from a home location register.

6. The method according to claim 1, further comprising sending, depending on the determined access type, a registration consideration indication that indicates whether a Service Centralization and Continuity Application Server (SCC AS) of the IMS is to consider the registration of the subscriber in the IMS when terminating a session to the subscriber.

7. The method according to claim 6, comprising sending the registration consideration indication either simultaneously with or subsequently to sending the registration request.

8. The method according to claim 6, wherein the registration consideration indication comprises at least one of an indication of registering support for an IMS speech service, an indication of registering support for media capabilities for the subscriber, an indication of the access type, and an indication whether to terminate a session to the subscriber.

9. The method according to claim 8, wherein the media capabilities comprise at least one of audio capabilities and of audio and video capabilities.

10. The method according to claim 6, comprising sending the registration consideration indication upon determining that the access type is a packet switched type, wherein the registration consideration indication comprises an indication that the SCC AS shall not consider the registration when terminating the session to the subscriber.

11. The method according to claim 6, comprising sending the registration consideration indication upon determining that the access type is a circuit switched type, wherein the registration consideration indication comprises an indication that the SCC AS shall consider the registration when terminating the session to the subscriber.

12. The method according to claim 6, further comprising:
sending, depending on the determined access type, a further registration request for circuit switched registering the subscriber in the IMS, and
sending, depending on the determined access type, a further registration consideration indication that indicates whether or not a Service Centralization and Continuity Application Server (SCC AS) of the IMS is to consider the registration of the subscriber in the IMS when terminating a session to the subscriber, wherein upon determining that the access type is a circuit switched type said sending the further registration consideration indication comprises sending a further registration consideration indication that indicates the SCC AS can consider the registration when terminating the session to the subscriber.

13. The method according to claim 1, wherein receiving the access request comprises receiving at least one of an initial location update request and a location update request.

14. The method of claim 1, wherein the call control node includes a Mobile Switching Center (MSC) server;

wherein receiving the access request includes receiving the access request from user equipment of the subscriber; and wherein sending the registration request includes sending the registration request to a Service Centralization and Continuity Application Server (SCC AS) of the IMS.

15. The method of claim 1, wherein the call control node is in a circuit-switched core network.

16. A call control node for circuit switched registering a subscriber in an IP Multimedia Subsystem (IMS), wherein the call control node comprises:

a receiving circuit configured to receive an access request of a subscriber for circuit switched accessing the IMS, the access request being received via an access, a determining circuit configured to determine an access type of the access, and a sending circuit configured to send, depending on the determined access type, a registration request for circuit switched registering the subscriber in the IMS.

17. The call control node according to claim 16, wherein the call control node comprises a further sending circuit configured to send a registration consideration indication that indicates whether a Service Centralization and Continuity Application Server (SCC AS) of the IMS is to consider the registration of the subscriber in the IMS when terminating a session to the subscriber.

18. The call control node according to claim 16, wherein the call control node comprises a Mobile Switching Center (MSC) Server.

19. The call control node of claim 18, wherein the receiving circuit is further configured to:

receive, from user equipment, the access request of the subscriber for circuit switched accessing the IMS; and wherein the sending circuit is further configured to:

send, to a Service Centralization and Continuity Application Server (SCCAS) of the IMS, the registration request for circuit switched registering the subscriber in the IMS.

20. The call control node of claim 16, wherein the access includes at least one of an interface to the call control node and an access network from which the subscriber accesses the call control node.

21. The method of claim 20, wherein the interface to the call control node is at least one of an Iu-cs interface and an A interface.

22. A method executed by a call control node for terminating a session to a subscriber, wherein the method comprises:

receiving, by the call control node, a registration request for circuit switched registering a subscriber in an IP Multimedia Subsystem (IMS), circuit switched registering the subscriber in the IMS, determining whether the registration of the subscriber in the IMS shall be considered when terminating the session to the subscriber, and terminating the session to the subscriber.

23. The method according to claim 22, wherein said determining comprises receiving a registration consideration indication that indicates whether the registration of the subscriber in the IMS shall be considered when terminating the session to the subscriber.

24. The method according to claim 22, wherein the method comprises receiving a further registration request for circuit switched registering the subscriber in the IMS, and wherein said determining comprises receiving a further registration consideration indication that indicates whether a Service Centralization and Continuity Application Server (SCC AS) of the IMS is to consider the registration of the subscriber in the IMS when terminating a session to the subscriber.

25. The method according to claim 22, wherein said determining comprises fetching status information of an access type of the access via which the subscriber accesses the IMS.

26. The method according to claim 25, wherein the status information comprises attachment information of the subscriber.

27. The method according to claim 22, wherein said determining comprises receiving a subscriber preference indication that indicates whether to consider the registration when terminating the session to the subscriber.

28. The method of claim 22, wherein the call control node includes a Service Centralization and Continuity Application Server (SCCAS) of the IMS; and wherein receiving the registration request includes receiving the registration request from a Mobile Switching Center (MSC) server.

29. A call control node for terminating a session to a subscriber, wherein the call control node comprises a receiving circuit configured to receive a registration request for circuit switched registering a subscriber in an IP Multimedia Subsystem (IMS), a registering circuit configured to circuit switched register the subscriber in the IMS, a determining circuit configured to determine whether the registration of the subscriber in the IMS shall be considered when terminating the session to the subscriber, and a terminating circuit configured to terminate the session to the subscriber.

30. The call control node according to claim 29, wherein the call control node comprises a Service Centralization and Continuity Application Server (SCCAS) of the IMS.

31. The call control node of claim 29, wherein the call control node includes a Service Centralization and Continuity Application Server (SCCAS) of the IMS; and wherein the receiving circuit is further configured to:

receive, from user equipment of the subscriber, the registration request for circuit switched registering the subscriber in the IMS.

* * * * *